United States Patent
Akman et al.

(10) Patent No.: US 11,336,538 B2
(45) Date of Patent: May 17, 2022

(54) SLICE ASSURANCE WITHIN A MOBILE NETWORK

(71) Applicant: Netsia, Inc., Santa Clara, CA (US)

(72) Inventors: Arda Akman, Istanbul (TR); Burcu Sahin, Istanbul (TR); Tugba Arici, Istanbul (TR)

(73) Assignee: Netsia, Inc., Santa Clara, CA (US)

( * ) Notice: Subject to any disclaimer, the term of this patent is extended or adjusted under 35 U.S.C. 154(b) by 0 days.

(21) Appl. No.: 17/105,833

(22) Filed: Nov. 27, 2020

(65) Prior Publication Data

US 2021/0160153 A1 May 27, 2021

Related U.S. Application Data

(60) Provisional application No. 62/940,887, filed on Nov. 27, 2019.

(51) Int. Cl.
*G06F 15/16* (2006.01)
*H04L 29/08* (2006.01)
*H04L 12/26* (2006.01)
*H04L 41/5009* (2022.01)
*H04L 41/0823* (2022.01)
(Continued)

(52) U.S. Cl.
CPC ...... *H04L 41/5009* (2013.01); *H04L 41/0823* (2013.01); *H04L 41/5019* (2013.01); *H04W 28/24* (2013.01); *H04W 36/26* (2013.01)

(58) Field of Classification Search
CPC ............ H04L 41/0823; H04L 41/0896; H04L 41/5022; H04L 41/5009; H04L 41/0816; H04L 41/147; H04L 41/5019; H04L 41/16; H04L 41/5025; H04L 43/0888;
(Continued)

(56) References Cited

U.S. PATENT DOCUMENTS

| 2017/0085493 | A1* | 3/2017 | Senarath | H04W 72/1257 |
| 2018/0152958 | A1* | 5/2018 | Arnold | H04L 41/5025 |
| 2019/0123963 | A1 | 4/2019 | Tang et al. | |
| 2019/0327657 | A1* | 10/2019 | Han | H04W 36/0055 |
| 2019/0335249 | A1* | 10/2019 | Shimy | H04N 21/42201 |
| 2020/0154459 | A1* | 5/2020 | Mukherjee | H04L 63/0892 |

(Continued)

FOREIGN PATENT DOCUMENTS

WO 2018/083664 A1 5/2018

OTHER PUBLICATIONS

International Search Report and Written Opinion of International Application No. PCT/US2020/062491, dated Mar. 15, 2021, 23 pp.
(Continued)

*Primary Examiner* — Abdullahi E Salad
(74) *Attorney, Agent, or Firm* — Shumaker & Sieffert, P.A.

(57) ABSTRACT

In general, techniques are described for slice assurance within a mobile network. In some examples, a method includes obtaining, by a slice assurance function (SAF) executed by a device, key performance indicator (KPI) values for a first slice of a plurality of slices implemented by a plurality of base stations serving a tracking area of a mobile network; determining, by the SAF, based in part on the KPI values for the first slice, a service level agreement (SLA) for the first slice has not been met; re-allocating, by the SAF in response to the determining, slice resources associated with any of the plurality of slices to compute a new slice configuration parameter for the first slice; and reconfiguring, by the SAF, at least one of the plurality of base stations to implement the new slice configuration parameter for the first slice.

19 Claims, 11 Drawing Sheets

(51) Int. Cl.
    *H04L 41/5019*     (2022.01)
    *H04W 28/24*     (2009.01)
    *H04W 36/26*     (2009.01)

(58) Field of Classification Search
    CPC ..... H04W 36/26; H04W 28/24; H04W 24/02; H04W 24/08
    See application file for complete search history.

(56) References Cited

U.S. PATENT DOCUMENTS

| | | | | |
|---|---|---|---|---|
| 2020/0186411 | A1* | 6/2020 | Ravichandran | H04L 41/0668 |
| 2020/0313985 | A1* | 10/2020 | Jayakumar | H04L 41/0896 |
| 2021/0014737 | A1* | 1/2021 | Yang | H04W 48/18 |
| 2021/0151056 | A1* | 5/2021 | Trim | G06F 16/248 |

OTHER PUBLICATIONS

China Telecom et al: "Discussion on network slice priority," a 3GPP Draft; S5-185607 Discussion on Network Slice Priority, 3rd Generation Partnership Project (3GPP), Mobile Competence Centre; Belgrade (Serbia); Aug. 20-24, 2018, Accessed Dec. 11, 2018, 2 pp.
China Mobile et al: "Solution for Key Issue 14: How to ensure that slice SLA is guaranteed," a 3GPP Draft S2-1813213 was 12836 Solution for KI 14 Slice SLA Guarantee V4.5, 3rd Generation Partnership Project (3GPP), Mobile Competence Centre; West Palm Beach, Florida, USA; Oct. 26-30, 2018, Accessed Dec. 2, 2018, 4 pp.
"Study on management and orchestration of network slicing for next generation network" 3rd Generation Partnership Project; Technical Specification Group Services and System Aspects; Stage 2, Release 15, 3GPP TSG TR 28.801, V15.1.0, Jan. 2018, 75 pp.
"System architecture for the 5G System (5GS)," 3rd Generation Partnership Project; Technical Specification Group Services and System Aspects; Stage 2, Release 16, 3GPP TS 23.501 V16.2.0, Sep. 2019, 376 pp.
"Service requirements for the 5G system," 3rd Generation Partnership Project; Technical Specification Group Services and System Aspects; Stage 1, Release 17, 3GPP TS 22.261 V17.0.0, Sep. 2019, 83 pp.

* cited by examiner

SLICE ASSURANCE WITHIN A MOBILE NETWORK

This application claims priority to U.S. Provisional Application No. 62/940,887, filed Nov. 27, 2019, the entire content of which is herein incorporated by reference.

TECHNICAL FIELD

The disclosure relates to mobile networks and, more specifically, to slices implemented within mobile networks.

BACKGROUND

One of the primary technical challenges facing mobile operators today is the ability to deliver a wide array of network performance characteristics which future applications and services will demand. To name a few, bandwidth, latency, packet loss, security, and reliability will greatly vary from one service to the other. Emerging applications such as remote operation of robots, massive IoT, and self-driving cars require connectivity, but with vastly different characteristics. The combination of architecture flexibility, software programmability, the needs of different vertical segments (medical, factories, military, public safety, etc.) and various types of applications have led to the creation of the concept of network slicing in 5G mobile networks. A network slice provides a convenient way to completely segment the network to support particular types of services or businesses. Furthermore, each slice is optimized according to capacity, coverage, connectivity, security, and performance characteristics such as delay. Since the slices can be isolated from each other, as if they are physically separated both in the control and user planes, the user experience of the network slice will be the same as if being on a separate network.

A network slice within the mobile operator's domain spans the software applications running on network nodes, the core network components, the transport network, and the radio access network (RAN) components. The 3GPP standards architected a sliceable 5G infrastructure to provide many logical network segments over a common single physical network (see 3GPP's TR 28.801 document titled 'Telecommunication management; Study on management and orchestration of network slicing for next generation network'). The technologies such as software defined networking (SDN), wherein control plane (CP) and user plane (UP) are separated, and network function virtualization (NFV) are the key enablers for slicing traditional network structures. Customizable and virtualized network components can be stitched together, using only software, to provide the right level of connectivity.

The 5G standardization efforts have gone into defining specific slices and their Service Level Agreements (SLAs) based on application/service type. For example, the user equipment (UE) can now directly specify its desired slice using a new field in the control messages called Network Slice Selection Assistance Information (NSSAI). A subfield of NSSAI is Slice/Service Types (SST) that is used to indicate the slice type. The standards already define most commonly usable network slice types and reserve the corresponding standardized SST values (see 3GPP TS 23.501). For example, SST values of 1, 2 and 3 correspond to slice types of enhanced Mobile Broadband (eMBB), ultra-reliable and low-latency communications (uRLLC), and massive IoT (MIoT), respectively. The Access and Mobility Management Function (AMF) of the core network retrieves the slices that are allowed by the user's subscription and interacts with the Network Slice Selection Function (NSSF) of the core network to select the appropriate network slice instance for that traffic. Furthermore, 3GPP specified new slice management functions such as Network Slice Management Function (NSMF) and Network Slice Subnet Management Function (NSSMF), whose sole role is to create, manage and monitor slice instances within the mobile operator's network for users/applications. The slice catalogue and all slice-specific service level agreements (SLAs) are stored within NSMF. Specific SLAs that correspond to the slice segments/subnets are stored within the NSSMF.

The SLAs are classified as contractual (static) SLAs and network (dynamic) SLAs. The static SLAs simply define the legal and financial terms and conditions between the slice-user and the operator as it applies to activation, operation, penalties, and termination of the slice. These SLAs do not change with changing network conditions and therefore stay static. A network SLA, on the other hand, mainly defines a quality of service (QoS) requirement. These broadly include slice availability/reliability (service uptime as a percentage of overall time), slice throughput (bits per second), packet latency (average and maximum packet delay in milliseconds), packet loss (percentage of lost packets over total packets in a defined time interval), capacity (bits per second per km2), etc. These network slice SLAs are well documented (see 3GPP TS 22.261). There are Key Performance Indicators (KPIs) that are collected from the network segments, in band or out of band, to measure the fulfilment of these SLAs over time. Network monitoring is the task of the Service Management and Orchestration (SMO) system and is well-defined within 3GPP standards documents.

SUMMARY

In general, techniques are described for slice assurance within a mobile network. During the life-time of a network slice, from initiation to termination, its service level agreements (SLAs) must be met in a mobile network, especially in the radio access network (RAN) side over a Tracking Area (TA), wherein each area is formed by a plurality of cells that must be able to meet the SLAs under time-varying packet flow volumes. A new control network function, called Slice Assurance Function (SAF), and its interface to the base stations (e.g., gNodeBs) are defined, in some examples for both near real-time (near-RT) and non real-time (non-RT) coordination of cell slice resource distribution across those plurality of cells with the aim of fulfilling a slice's RAN-specific SLAs within the area.

For example, the SAF may first determine target RAN-specific slice Key Performance Indicators (KPIs) that must be monitored within the TA for each slice instance and their respective thresholds, and the SAF enables activation of relevant Performance Management (PM) jobs within each gNodeB it controls. The SAF monitors these KPIs and checks against the thresholds, and based on the checks the SAF may repeatedly fine-tune slice resource distribution to gNodeBs. When the mobile traffic density or characteristics changes within the TA over time, the SAF computes a new distribution of available resource parameters at any one or more of RAN protocol layers 1, 2 and 3, and sends reconfiguration commands to gNodeBs using the new interface. In this way, the SAF may facilitate the practical application of an over-area and over-time slice resource redistribution. The SAF may retrieve the slice attributes and per-slice SLAs from the Network Slice Subnet Management Function (NSSMF), sends slice-specific notifications to responsible parties when/if the SLAs cannot be met by resource reconfiguration, and sends PM jobs for KPI monitoring to the gNodeBs.

In some examples, a method includes obtaining, by a slice assurance function (SAF) executed by a device, key performance indicator (KPI) values for a first slice of a plurality of slices implemented by a plurality of base stations serving a tracking area of a mobile network; determining, by the SAF, based in part on the KPI values for the first slice, a service level agreement (SLA) for the first slice has not been met; re-allocating, by the SAF in response to the determining, slice resources associated with any of the plurality of slices to compute a new slice configuration parameter for the first slice; and reconfiguring, by the SAF, at least one of the plurality of base stations to implement the new slice configuration parameter for the first slice.

In some examples, a slice assurance function (SAF) for a mobile network comprises a slice performance collector comprising processing circuitry and configured to obtain key performance indicator (KPI) values for a first slice of a plurality of slices implemented by a plurality of base stations serving a tracking area of the mobile network; a slice optimizer subsystem comprising processing circuitry and configured to determine, based in part on the KPI values for the first slice, a service level agreement (SLA) for the first slice has not been met, wherein the slice optimizer subsystem is further configured to re-allocate, in response to the determining, slice resources associated with any of the plurality of slices to compute a new slice configuration parameter for the first slice; and a slice control actions subsystem comprising processing circuitry and configured to reconfigure at least one of the plurality of base stations to implement the new slice configuration parameter for the first slice.

In some examples, a mobile network comprises a plurality of base stations comprising respective Slice Assurance Function clients and a Slice Assurance Function comprising processing circuitry and configured to obtain key performance indicator (KPI) values for a first slice of a plurality of slices implemented by a plurality of base stations serving a tracking area of a mobile network; determine, based in part on the KPI values for the first slice, a service level agreement (SLA) for the first slice has not been met; re-allocate, in response to the determining, slice resources associated with any of the plurality of slices to compute a new slice configuration parameter for the first slice; and communicate, via an interface, the new slice configuration parameter for the first slice to one of the Slice Assurance Function clients to cause the one of the Slice Assurance Function clients to reconfigure the corresponding base station to implement the new slice configuration parameter for the first slice.

The details of one or more examples of this disclosure are set forth in the accompanying drawings and the description below. Other features, objects, and advantages will be apparent from the description and drawings, and from the claims.

BRIEF DESCRIPTION OF THE DRAWINGS

Like reference characters denote like elements throughout the description and figures.

DETAILED DESCRIPTION

Figure 1:
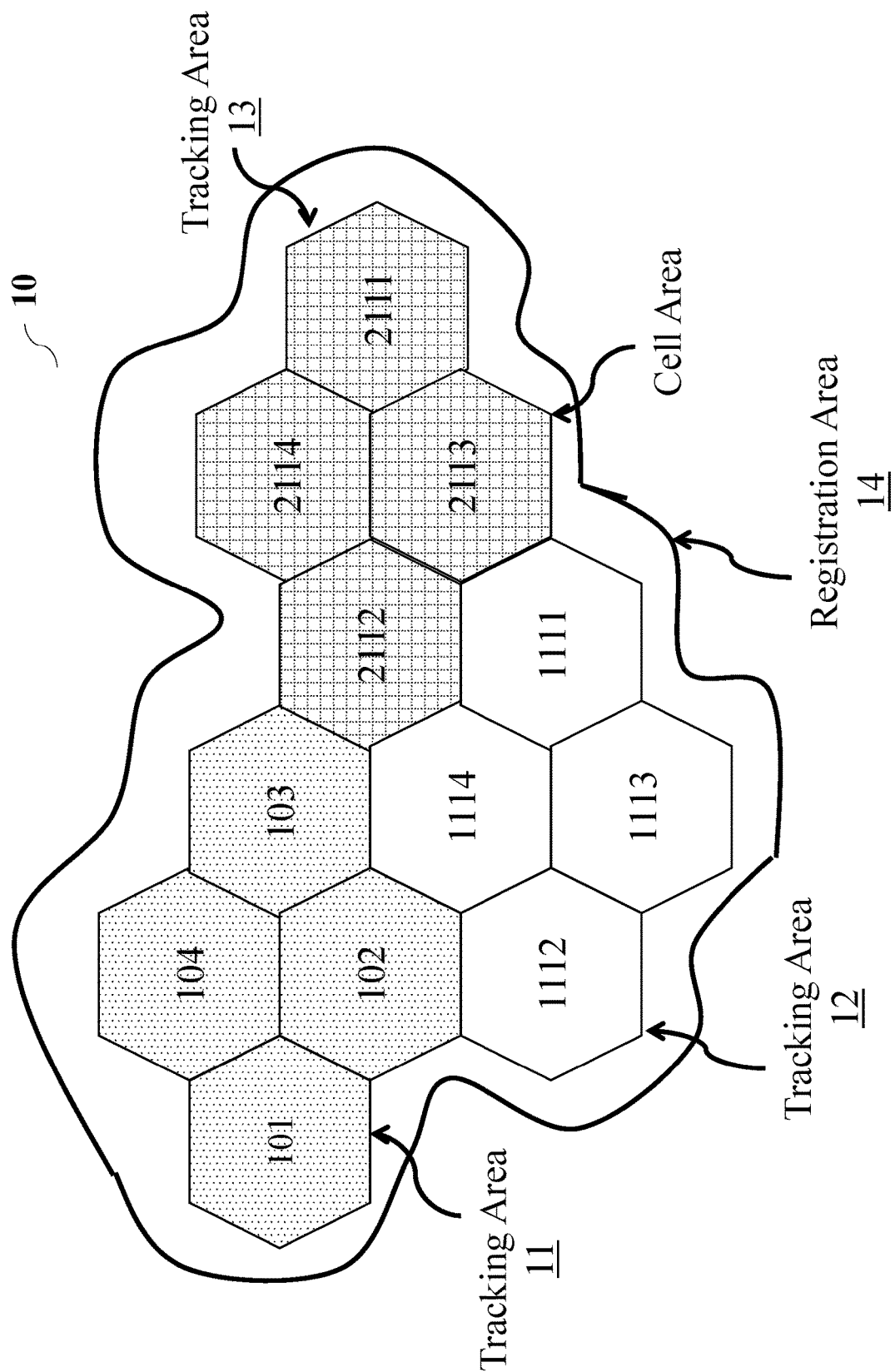
FIG. 1 is a block diagram showing an example logical 5G RAN architecture.

In general, a mobile operator's SLA may be defined on a per slice basis and comprises the path from the UE to the exit point from the mobile network. That exit point may be the destination site, or it may be a gateway function to the public Internet. However, a slice is comprised of many segments even within the mobile network. That SLA often has different segments, such as a) a RAN segment (including both fronthaul and midhaul components)
b) a transport segment (also known as backhaul)
c) a core network segment Each of these segments contributes to an SLA in different ways. For example, latency is determined by adding up the delay of packets within all said segments. The availability and packet loss are determined similarly, i.e., by adding up the contribution of all segments. To the contrary, the throughput and capacity must be identical across all segments. From the slice SLA, NSMF must derive the RAN-specific slice SLA portion that will be controlled by the system according to techniques described herein. The RAN-specific SLAs may be stored within and available for access from the NSMF or NSSMF.

The 5G-radio access network has a distributed architecture. The base station, also known as gNodeB, is divided into three functional components: Central Unit (CU), Distributed Unit (DU) and Radio Unit (RU), which can be deployed in various configurations. The CU performs the upper layer protocol processing. The DU performs lower layer protocol processing. Using the newly defined open F1 interface, different DU and CU vendors can now interoperate. The CU is also divided into the control plane and user plane functions, CU-CP and CU-UP, respectively. While CU-CP controls a plurality of CU-UPs using the E1 interface; the CU-CP also controls all of its subtending DUs using the F1-C interface. The RU that manages the RF layer has antenna arrays of various sizes and shapes. Depending on operator and service requirements, the gNodeB can be deployed monolithically, i.e., RU, DU and CU reside within the cell site, or these functionalities can be distributed across sites, for example, RU and DU may reside in a cell site while the CU resides in the edge cloud site controlling a plurality of these distributed DUs. Since the DU-CU interface is more tolerant to delay, they can be separated by distance, but it is more likely that the RUs and DUs will be collocated given the interface would be more delay sensitive. The trade-off between implementations depends on the traffic requirements and economies of these components. For simplicity, within this document, the term gNodeB or base station may be used interchangeably and without distinguishing how its distributed components are deployed within cell sites.

The 5G standards define a Registration Area (RA) that comprises a plurality of Tracking Areas. The concept of Tracking Area comes from 4G networks, while the Registration Area (RA) is newly defined in 5G. Each Tracking Area (TA) is comprised of a plurality of cells. Each cell is identified by the cell ID. A User Equipment (UE) is said to be within a cell, a TA and a RA, at any point in time. A UE is also allowed to support up to 8 different network slices that must be supported by the cell/TA/RA infrastructure.

First, the UE registers with AMF, which provides the UE with the TA Id (TAI) and thus the registration area it is in. The slice is described with Service Level Agreements (SLAs) that are applicable throughout a Tracking Area. However, the Tracking Area is comprised of a plurality of cells, and the UEs radio access network conditions and density distribution across these different cells of the Area changes over time. There is no mechanism defined within the standards as to how to assure that the RAN-specific slice SLAs are met across cells as the traffic volumes change. Furthermore, the network KPIs are defined on an end-to-end basis including both the RAN and core network segments. In some examples, the techniques include deriving RAN-specific slice KPI counterparts to monitor and validate these RAN-specific SLAs.

According to some examples of this disclosure, example Slice Assurance Functions (SAFs) and example methods are developed so that the RAN-specific slice SLAs are met over-time and over-area (e.g., Tracking Area) when there is a large number of cells in an area. SAF collects KPIs from all gNodeBs, either directly or via service management and orchestration (SMO) system of the 5G network, and compares with thresholds associated with each SLA component's fulfillment, and makes a determination if all SLAs are met across all cells per TA over time. If not, SAF uses an algorithm to determine the redistribution ratio of radio access network resources across the cells by computing distribution of the slice resources per cell across a plurality of slices. Doing so, SAF achieves a dynamic radio resource allocation (DRRA) across cells of a Tracking Area.

According to some examples of this disclosure, algorithms for determining redistribution described herein may (i) re-allocate slice resources unused by other slices to those slices that need the extra slice capacity to meet the SLA on the same gNodeB, (ii) re-allocate slice resources that are being used by slices of lower priority to those slices with higher priority even when both slices need the extra capacity to meet the SLA, and/or (iii) re-allocate slice resources across a plurality of gNodeBs by diverting slice traffic to other gNodeBs (or components) when extra capacity is needed to meet the SLA. All of these actions may be performed in either near real-time, i.e., under 1 second or in non real-time, i.e., over 1 second, depending on the implementation choices. Different examples may perform any combination of (i), (ii), and (iii).

According to some examples of this disclosure, the Slice Assurance Function (SAF) interfaces with all gNodeBs (or their subcomponents) to send reconfiguration commands. These commands are received by a 'SAF client', a software subsystem implemented in each gNodeB, to receive said reconfiguration commands and to enable activation of configuration changes in the gNodeB, accordingly.

According to some examples of this disclosure, SAF is implemented as a subcomponent of RAN Intelligent Controller (RIC) that is well known in prior art (also known as RAN Edge-Cloud Controller). Doing so, SAF leverages RIC's already defined and implemented interfaces to SMO and to NSMF/NSSMF for collection of KPIs, Tracking Area's RAN-specific SLAs and for alarm notification. The interface between SAF and each gNodeB is denoted as E2++, an extended version of the E2 interface that is defined between RIC and gNodeB. In this example, the control of gNodeB in in near real-time.

According to some examples of this disclosure, SAF is implemented as a subcomponent of the SMO. Doing so, SAF leverages SMO's internal NSMF/NSSMF, Performance Management function for KPI collection and, Alarm/Fault Management function for alarm notification. The interface between SAF and each gNodeB is denoted as O1++, an extended version of the O1 interface that is defined between SMO and gNodeB. In this example, the control of gNodeB may be in non-real-time.

According to some examples of this disclosure, a subcomponent of SAF ($SAF_{SMO}$) is implemented within the SMO and another subcomponent is implemented within the RIC ($SAF_{RIC}$) to ensure a coordinated near-RT and non-RT controls of the gNodeBs. Also, the A1 interface between MC and SMO is extended as A1++ to support the communications between these two subcomponents of SAF. In such a more complex architecture, the $SAF_{SMO}$ engages in the algorithms/methods (such as those using artificial intelligence/machine learning) to determine the needed controls, and communicate these control actions and policies to $SAF_{RIC}$ (using A1++), which executes them in near-RT. SAF may implement controls both in near-RT and non-RT on a case-by-case basis. In this scenario, the interface between $SAF_{SMO}$ and gNodeB is O1++, while the interface between $SAF_{RIC}$ and gNodeB is E2++.

The 5G RAN supports Orthogonal Frequency-Division Multiplexing (OFDM) in the physical layer with different numerologies (e.g. different subcarrier spacing and cyclic prefix lengths) and adaptable time and frequency frame structures, meaning selectable slot durations and dynamic assignment of DL/UL transmission direction. Moreover, the UEs that are served by the same cell can be instructed to receive or transmit using only a subset of the cell resource grid. Aforementioned radio parameters are all adjustable in the RAN protocol layers. Furthermore, the reconfiguration of slice parameters within a cell in the radio network is achieved simply by changing, for example, the assignment of the share of the cell resource grid over time and frequency axis. At the upper layers of the protocol stack, the slice SLAs are met by the proper handling of Data Radio Bearers (DRBs), for example, by specific scheduling rules and/or radio protocol stack configuration for the corresponding DRBs and immediate scheduling of URLLC type flows. These are exemplary gNodeB layer 1, layer 2 and layer 3 parameters that can be adjusted within each cell to deliver the slice SLAs, some of which are defined in terms of performance requirements such as throughput, energy efficiency, latency and reliability. These requirements are defined to assess SLAs of each slice, which individually need proper handling in gNodeB protocol layers. In the case of throughput requirement, slice-based Physical Resource Block (PRB) utilization, link adaptation scheme controls, Modulation and Coding Scheme (MCS) levels and Transport Block (TB) sizes are some of the exemplary configurable parameters. Similarly, the slices with high-energy efficiency requirement can be adjusted with Discontinuous Reception (DRX) configuration. As mentioned before, energy efficient UEs can be configured with low bandwidth to prevent energy consuming wideband operations enabled by 5G New Radio (NR). Switching between Bandwidth Part (BWP) is simply guided by the policy received from SAF. Concerning latency requirements, non-slot based scheduling and preemptive scheduling are supported by 5G NR. If utilization of the Resource Blocks in a BWP is high, SAF manages the preemption policy, which will allow high priority delay sensitive services to be served through interruption of the resource allocation to other delay-tolerant or less prioritized services e.g. mobile broadband. In order to support reliability requirement of the slices, alternative MCS table with low spectral efficiency has been introduced. Based on the reliability requirement of slices, SAF manages dynamic MCS table signaling in the downlink and uplink data transmission. Related to reliability, Packet Data Convergence Protocol (PDCP) might be configured to generate duplicate packets, which are routed to different RLC entities. Another method for increasing reliability is configuring the UEs with receiving Physical Data Shared Channel (PDSCH) with repetition in consecutive slots. Advantage of using repetition is that latency is decreased since base station is not required to wait for the HARQ acknowledgement from the UE while increasing the probability of successful reception. Each of the above parameters is a non-exhaustive list of slice parameters that parameterize and affect slice operation. Slice parameters may also be referred to herein as "slice configuration parameters," for the SAF may configure components of the mobile network to operate according to the slice parameters.

In some examples, SAF obtains the number and type of slices supported by each Tracking Area and associated RAN-specific slice SLAs by communicating with the Network Slice Subnet Management Function (NSSMF) that is responsible for the specific Tracking Area. The SAF also sends slice notifications, when there are violations, such as warnings and alarms to subscribed entities, which can be NSSMF and/or Service Management & Orchestration (SMO) depending on operator deployment. The SAF further communicates with SMO so that it can receive policies, which will be used for target RAN slice KPI derivation. Depending on the operator's choice, NSSMF and NSMF may be implemented as a component of the SMO, or they may be deployed as separate functions.

The functionalities of SAF can be implemented (i) integrated into the RAN Intelligent Controller (MC) for near RT (near-RT) controls, (ii) integrated into the SMO for non RT controls (non-RT), (iii) integrated (as split functions) across SMO and RIC for both near RT and non RT controls, or (iv) as a separate Virtual or Physical Network Function (VNF/PNF) that communicates directly with the RIC and SMO for possibly both near RT or non RT controls on a case by case basis. An example interface towards gNodeB for (i) above is the extended version of the E2 interface, which is currently defined for collecting near real-time information (e.g., UE basis and Cell basis) from gNodeBs and for providing value added services. In an example, E2 is extended to send reconfiguration commands, and denoted as E2++. Another exemplary interface towards gNodeB for (ii) above is the extended version of the O1 interface, which is currently defined for non real-time interactions with the gNodeBs. In an example, O1 is extended to send reconfiguration commands, and denoted as O1++. Another exemplary interface is an extension of A1 interface between RIC and SMO to send commands between subcomponents of SAF implemented within RIC and SMO, and denoted by A1++. Furthermore, a completely new interface may also be designed between the SAF and SAF client that is not reliant on the existing interfaces such as O1 and E2.

The Key Performance Indicators (KPIs) are collected using, e.g., in-band and/or out-of-band data collection methods from gNodeBs, at RAN protocol layers 1, 2 and 3 gathered either using the actual user packet flows or synthetically generated packet flows. These KPIs may further be broken down into per RU, DU and CU components, and midhaul and fronthaul facilities, to factor in any delay, packet loss or availability associated with these specific subcomponents of the RAN.

An example algorithm of SAF that may compute the RAN-specific slice resource reallocation is the computation of redistribution weights that accommodates traffic bursts by using the concept of a 'range' of resources (e.g., 20%±5%,). These ranges simply allow for minor SLA violation incidences that create non-critical conditions and do not require any RAN slice resource adjustments. Doing so, frequent reconfigurations of the gNodeBs are avoided.

An electronic device (e.g., gNodeB, UPF-User Plane Function, AMF, controller, etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of example instances of the techniques of this disclosure may be implemented using different combinations of software, firmware, and/or hardware.

As used herein, a network device such as a base station, switch, controller, or a control function is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, layer-3 switching, bridging, VLAN (virtual LAN) switching, layer-2 switching, Quality of Service, and/or subscriber management), and/or provide support for traffic coming from multiple application services (e.g., data, voice, and video).

The User Equipment (UE) is a user device such as a cellular phone, pad, a mobile sensor, a computer or another type of equipment that wirelessly connects to the mobile network. Any physical device in the network has a type, location, ID/name, Medium Access Control (MAC) address, and Internet Protocol (IP) address. Furthermore, a physical device can host a collection of VNFs, each identified for example by a virtual port number and/or virtual IP address.

Note that while the illustrated examples in the specification discuss mainly 5G networks relying on SDN, and NFV, examples that implement the techniques described herein may also be applicable in other kinds of network (mobile and non-mobile) that are sliceable.

FIG. 1 illustrates an exemplary radio access network (RAN) 10 having a Registration Area (RA) 14 with three Tracking Areas 11, 12, and 13. Tracking Area 11 has cells 101, 102, 103 and 104. Tracking Area 12 has cells 1111, 1112, 1113 and 1114. Finally, Tracking Area 13 has cells 2111, 2112, 2113, and 2114. A unique Tracking Area Id (TAI) identifies each Tracking Area. The RA 14 is defined as a set of Tracking Areas. A unique Cell Id identifies each cell within a TA.

Figure 2:
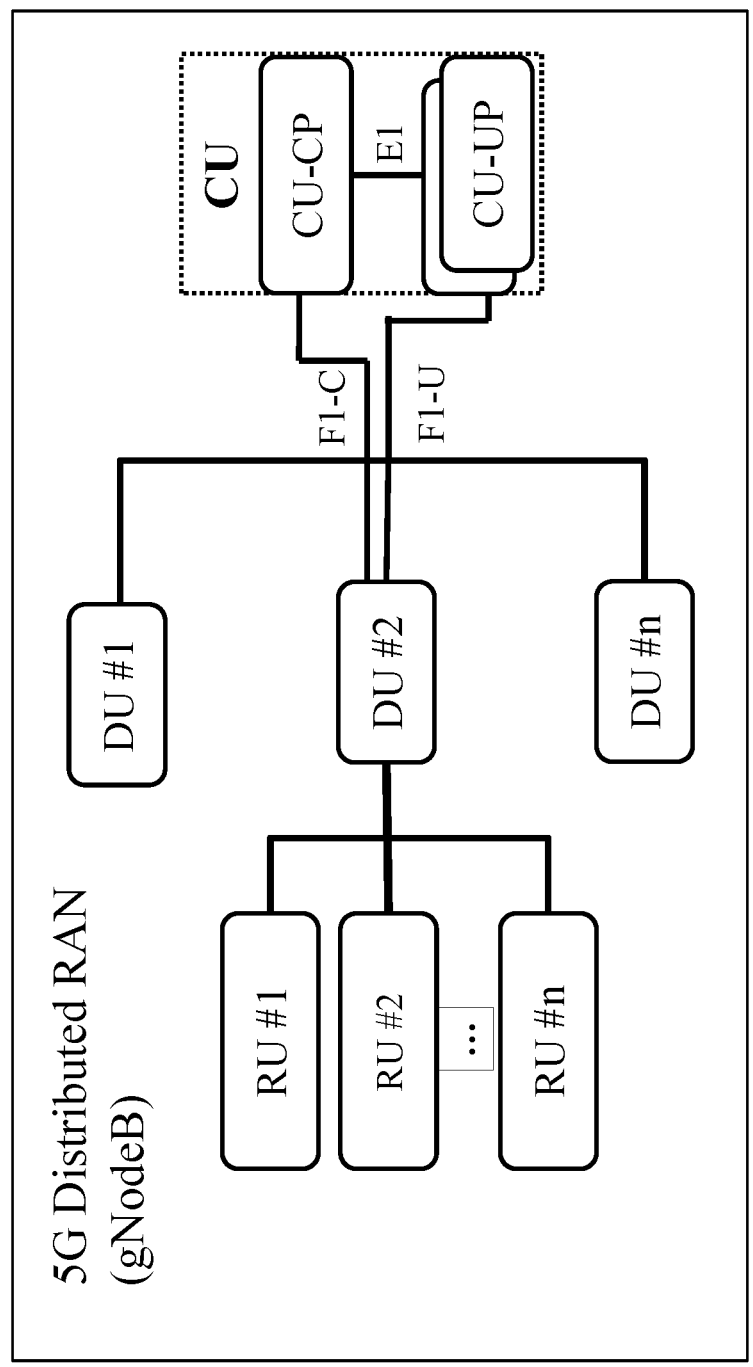
FIG. 2 is a block diagram showing a distributed gNodeB Architecture for a 5G mobile network.

Each cell within a Tracking Area has an associated base station (gNodeB). The 5G base station architecture distributes various components that form a base station. The Central Unit (CU), Distributed Unit (DU) and Radio Unit (RU) are the basic components, as illustrated in FIG. 2. The RUs support the radio interface, and for that, carry the antenna arrays. The brain of the gNodeB is the CU, which mainly performs layer 3 operations, which is controlled by CU-CP. The CU-CP controls both the CU-UP and all its subtending DUs. Shown in the figure is a single CU with three subtending DUs: DU #2 has three RUs (RU #1, #2 and #3), wherein DU #1 and DU #2 have integrated RUs. The gNodeB can be deployed in various configurations depending on cell requirements and traffic types.

FIGS. 3A, 3B, 3C and 3D illustrate simplified diagrams to contrast the slice resource utilization according to the existing 3GPP specifications, and slice resource reconfiguration according to techniques of this disclosure within a simple TA that has two cell sites (supported by gNodeB 1 and gNodeB 2, respectively), and two slice instances: slice-1 and slice-2. The total throughput initially configured for both slice-1 and slice-2 is 3 Mbps per slice, which is configured on both gNodeB 1 and gNodeB 2 that make up the Tracking Area in this simple example.

Figure 3A:
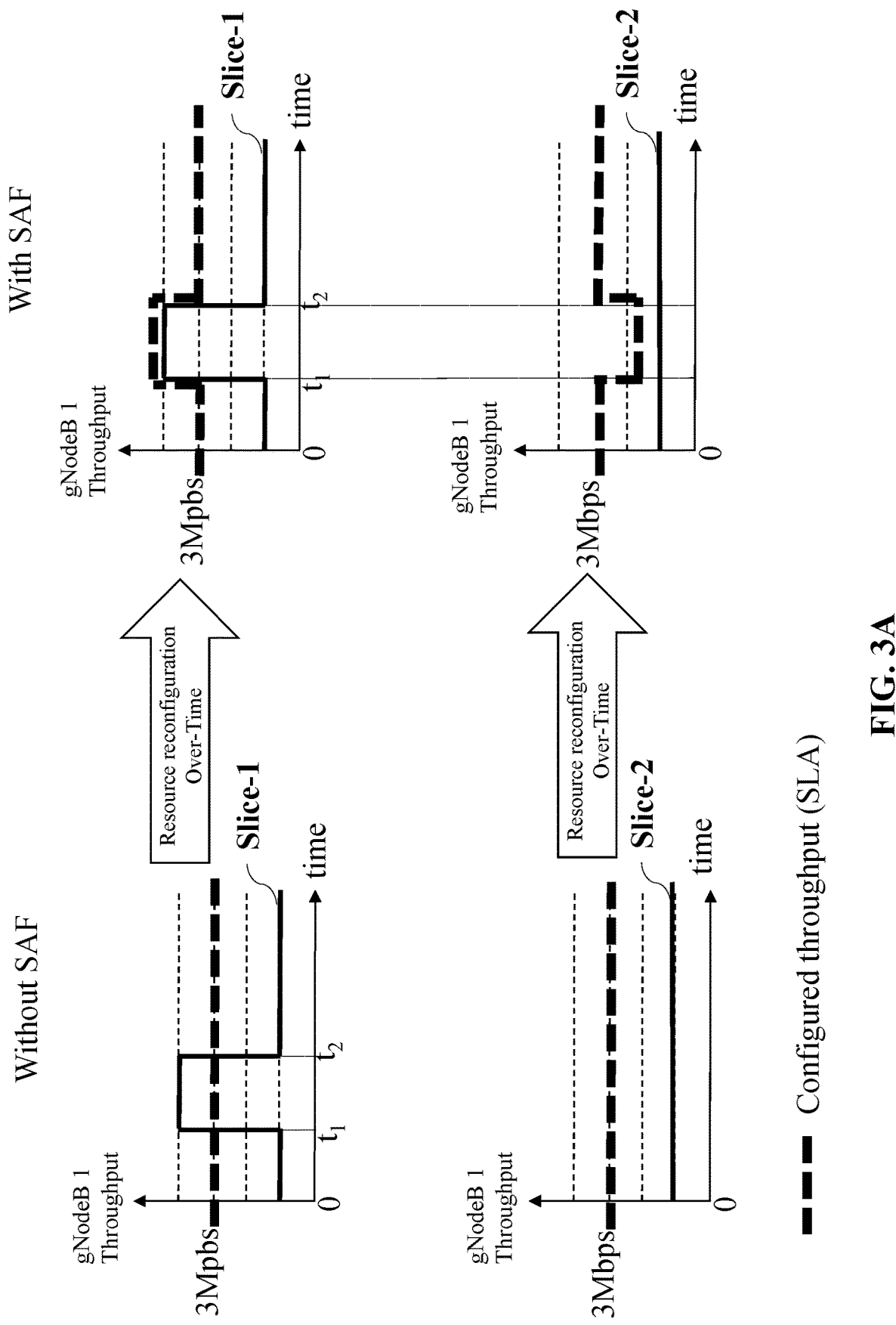
FIG. 3A is a block diagram illustrating one type of slice resource usage reconfiguration across two slices, in accordance with techniques of this disclosure.

FIG. 3A shows the slice throughput that materializes over time for slice-1 and slice-2 on gNodeB 1. We note that while the traffic of slice-2 is relatively light, the slice-1 traffic exceeds the configured throughput between times $t_1$ and $t_2$. By performing the over-time resource configuration according to this example, throughput is 'borrowed' from slice-2 and shifted to slice-1 on gNodeB 1 by reconfiguring the throughput parameters of gNodeB 1 only.

Figure 3B:
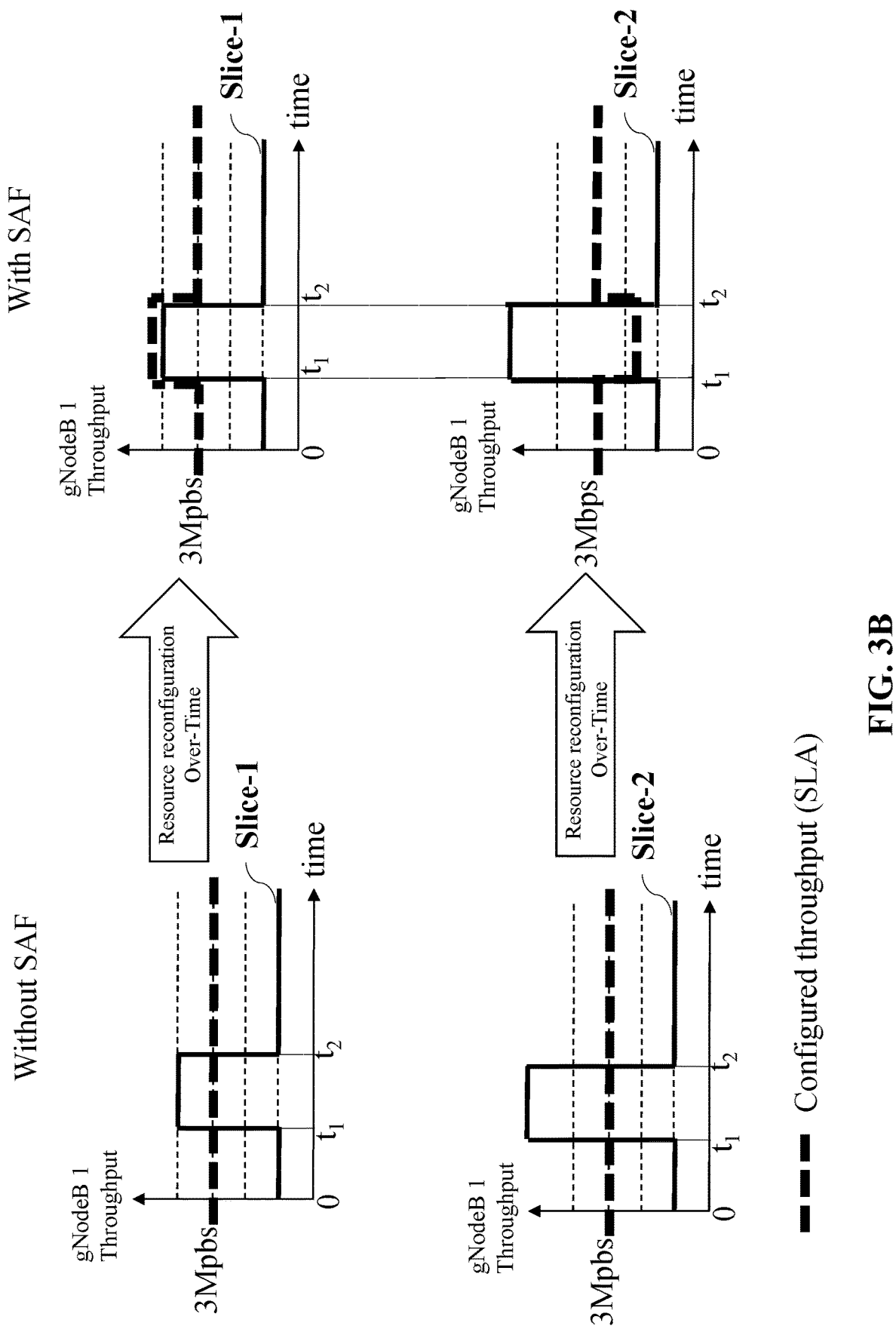
FIG. 3B is a block diagram illustrating another type of slice resource usage reconfiguration across two slices, in accordance with techniques of this disclosure.

FIG. 3B shows another type of slice throughput that materializes over time0 for slice-1 and slice-2 on gNodeB 1. While the traffic of both slices 1 and 2 are high, slice-1 is a higher priority slice. The traffic for both slices exceed the configured throughput between times $t_1$ and $t_2$. By performing the over-time resource configuration according to this example, the throughput is borrowed from slice-2 that is of lower priority and shifted to slice-1 on gNodeB 1 by reconfiguring the throughput parameters of gNodeB 1 only.

Figure 3C:
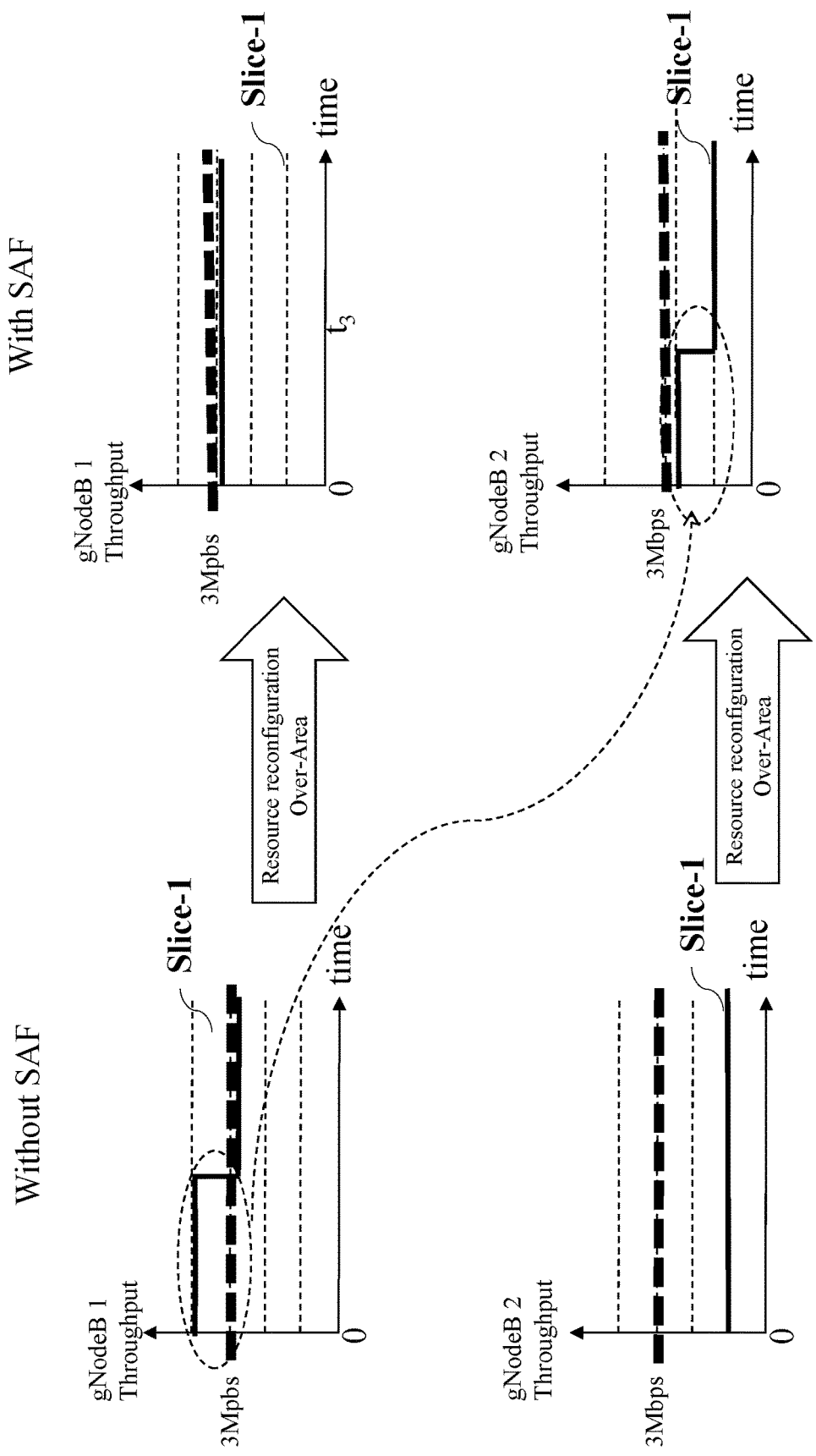
FIG. 3C is a block diagram illustrating one type of the slice resource usage reconfiguration across two gNodeBs for the same slice, in accordance with techniques of this disclosure.

FIG. 3C shows the slice throughput that materializes over time for slice-1 on gNodeB 1 and gNodeB 2. We note that while the traffic of slice-1 is relatively light on gNodeB 2, it exceeds the configured throughput in gNodeB 1. By performing the over-Area resource configuration according to techniques of this disclosure, the throughput is borrowed from gNodeB 2 by forcing users of slice-1 on gNodeB 1 to handover to gNodeB 2. For example, SAF 400 may reconfigure gNodeB 1 and/or gNode B with different antenna power or change load balancing parameters of the gNodeBs to force handover.

Figure 3D:
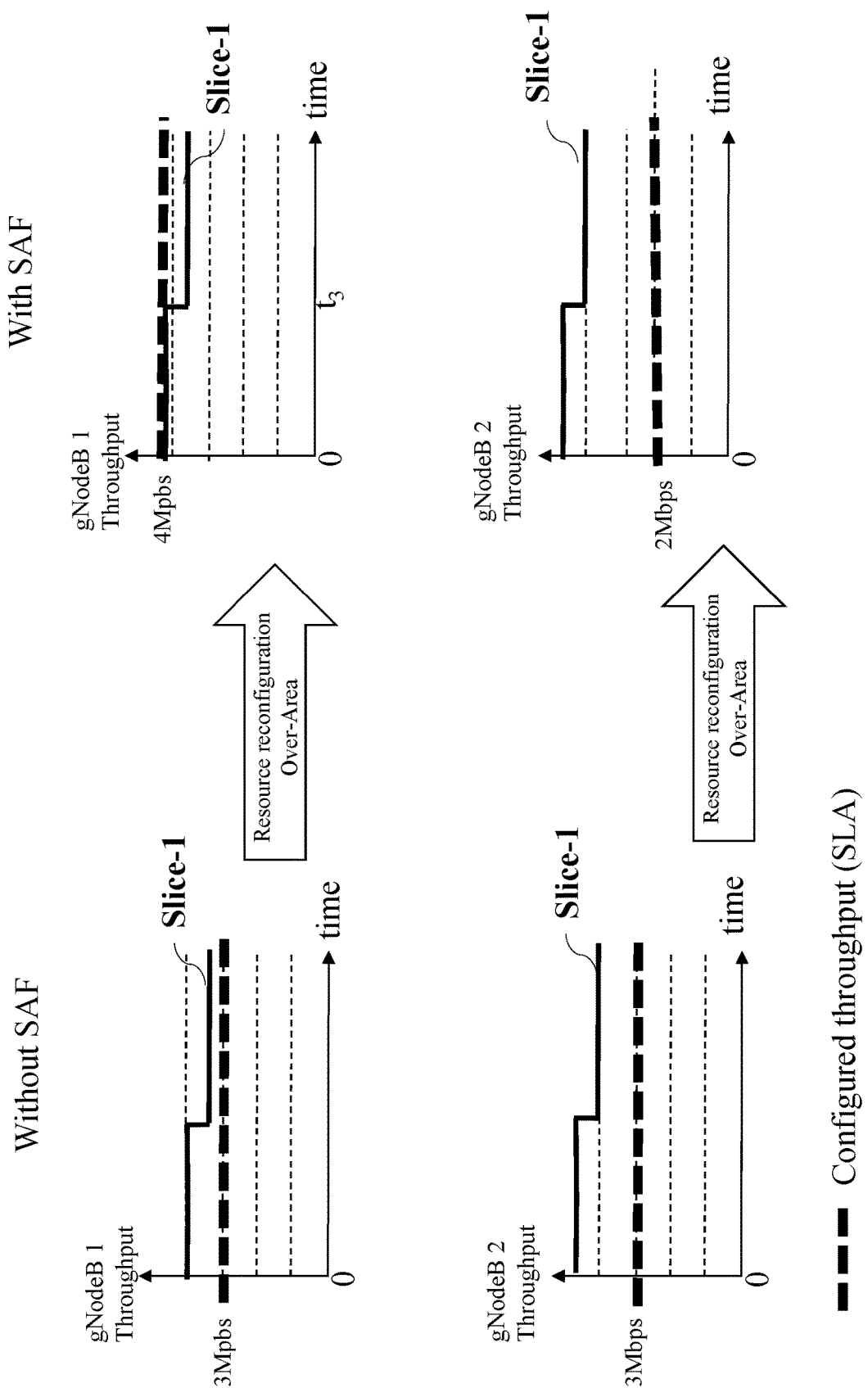
FIG. 3D is a block diagram illustrating another type of the slice resource usage reconfiguration across two gNodeBs for the same slice, in accordance with techniques of this disclosure.

FIG. 3D shows another instance of slice throughput that materializes over time for slice-1 on gNodeB 1 and gNodeB 2. The traffic of slice-1 is high and exceeds the configured throughput on both gNodeB 1 and gNodeB 2. By performing the over-area resource configuration according to this example, the throughput is borrowed from gNodeB 2 to meet the excess slice-1 traffic on gNodeB 1. Although slice-1's throughput SLA is still not met on gNodeB 2, it is met on gNodeB 1 by doing so. These reconfigurations illustrate how dynamic weights are assigned to throughput distribution across base stations over an area and across slices over-time according to this example. A higher weight for the slice throughput is given to slice-1 between times $t_1$ and $t_2$ (25% more) on gNodeB 1 in FIGS. 3A and 3B. Similarly, a higher weight to gNodeB 1 throughput is given compared to gNodeB 2's for slice-1 (25% more) in FIG. 3D. Doing so, both over-time and per-area slice throughput is improved.

Let $I=\{1, 2 \ldots n\}$ denote the set of slices in the TA and $C=\{1, 2 \ldots m\}$ denote the set of cells in the TA. For each slice $i \in I$, let $d_i$ indicate the guaranteed data rate requirement for each UE indicated in the SLA and let the set U be the UEs receiving service from slice i. In this scenario, $R_u$ indicates the experienced data rate of the UE $u \in U_i$.

Hence, the following expression is an example performance indicator which shows whether the UEs in slice $i \in I$ is reaching the slice-specific guaranteed data rate requirement.

$$\frac{1}{|U_i|} \sum_{u \in U_i} x_u * 100 \quad \forall i \in I.$$

Wherein $x_u$ is the normalized rate of UE $u \in U_i$, which is bounded between 0 and 1.

$$x_u = \begin{cases} 1, & \text{if } \frac{R_u}{d_i} \geq 1 \\ \frac{R_u}{d_i}, & \text{otherwise} \end{cases}.$$

The result of this expression is used by SAF to update RAN specific parameters, which effects the UE rate directly. As mentioned before, PRB allocation for each slice is one of the parameters used for throughput requirements. Let $w_i^j$ indicates the percentage of the PRBs allocated to slice $i \in I$ and cell $j \in C$. Accordingly, $$\sum_{i \in I} w_i^j = 100\% \quad \forall j \in C.$$

Different slices within a TA, and the PRB distribution across the plurality of cells forming the TA can be represented in a matrix for a better understanding of the results of over-area and over-time reconfiguration. The columns represent different types of slices in the TA while rows represent the cells/gNodeBs within the TA that are configurable. In an exemplary scenario, we assume that there are four slices ($I_1$, $I_2$, $I_3$, and $I_4$) and three cells ($C_1$, $C_2$, and $C_3$) in the TA. Slice 3 is a 'high-priority' slice (from one or more SLAs perspective). The resource distribution at time $t=t_0$ in percentages is shown below. Note that the total resources per cell, across all slices, must add up to 1:

|       | $I_1$ | $I_2$ | $I_3$ | $I_4$ |
|-------|-------|-------|-------|-------|
| $C_1$ | 30%   | 20%   | 30%   | 20%   |
| $C_2$ | 0     | 0     | 60%   | 40%   |
| $C_3$ | 10%   | 20%   | 50%   | 20%   |

At time $t=t_1$, the traffic of slice 3 has significantly increased in cells $C_1$. SAF checks if guaranteed throughput per UE in slice 3 is met. Additionally, SAF checks radio resource utilization and load of the slice e.g. average number of PRBs used in the previous time interval for data traffic. According to an example of the techniques of this disclosure, the $C_1$ resources are borrowed from $I_1$ and $I_2$ and shifted onto I3 providing a higher percentage usage to slice 3.

|    | $I_1$ | $I_2$ | $I_3$ | $I_4$ |
|----|-------|-------|-------|-------|
| C1 | 10%   | 10%   | 60%   | 20%   |
| C2 | 0     | 0     | 60%   | 40%   |
| C3 | 10%   | 20%   | 50%   | 20%   |

The optimization algorithm of SAF computes the resource distribution configuration parameters for each cell and each slice during each observation period. Note that the SAF optimization algorithm may use a simple heuristic algorithm, many of which are known in prior art, or a sophisticated machine learning technique using Artificial Intelligence (AI) such as Deep Learning that learns and improves the slice traffic's response to various resource distribution actions over time.

Figure 4A:
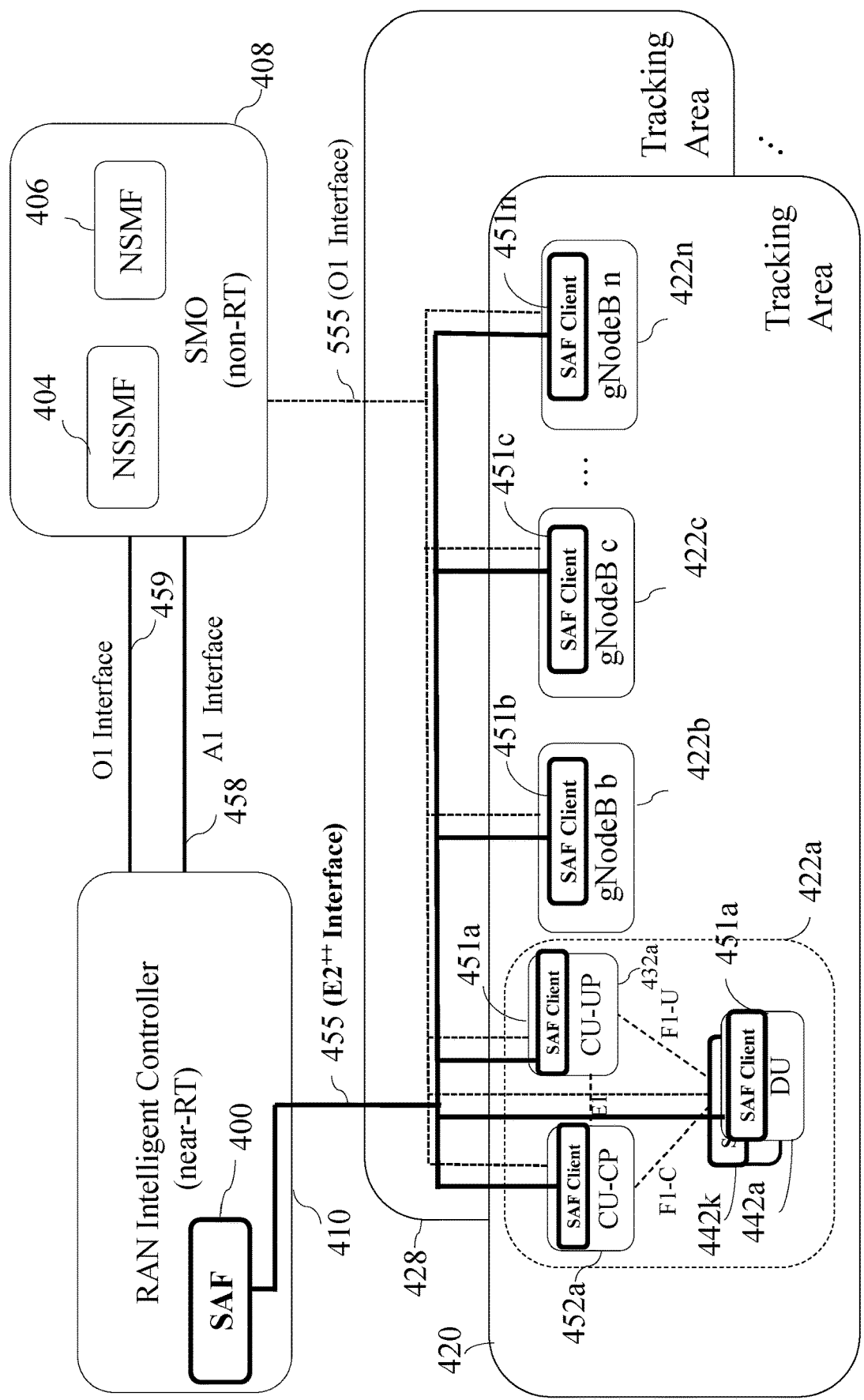
FIG. 4A is a block diagram illustrating an example system with the SAF, the SAF client and the $E2^{++}$ interfaces for near-RT controls, in accordance with techniques of this disclosure.

FIG. 4A illustrates Tracking Area 420 with many cell sites: gNodeB 422*a*, 422*b*, 422*c* . . . 422*n*. The distributed components of gNodeB 422*a* are also shown. These are CU-CP 452*a*, CU-UP 432*a* and DUs 442*a*-*k*. CU-CP 452*a* controls CU-UP 432*a* using E1 interface, and controls DU 442*a* using F1-C interface. Example components for implementing techniques of this disclosure may include: (i) SAF 400, which makes decisions on resource redistribution overtime and area based on the RAN-specific SLAs and collected KPIs, and controls all said base stations, (ii) interface between SAF 400 and all gNodeBs, the E2$^{++}$ interface, and (iii) SAF client 451*a,b* . . . n that receive the reconfiguration commands through E2$^{++}$ interface and in some cases enable the execution in near-RT.

SAF 400 obtains each slice type supported within the Tracking Area as well as the SLAs associated with each slice from the Network Slice Subnet Management Function (NSSMF) 404 through RIC 410. NSSMF 404 is assumed to obtain the RAN-specific slice SLA catalogue and specific SLA component information from NSMF 406.

SAF 400 collects near real-time performance data related to the slice SLAs either directly from all base stations using the E2$^{++}$ interface, or via the SMO 408 using A1 interface 458. SMO 408 receives notifications such as warnings and alarms from SAF 400 when the slice SLA cannot be met using the same interface.

Figure 4B:
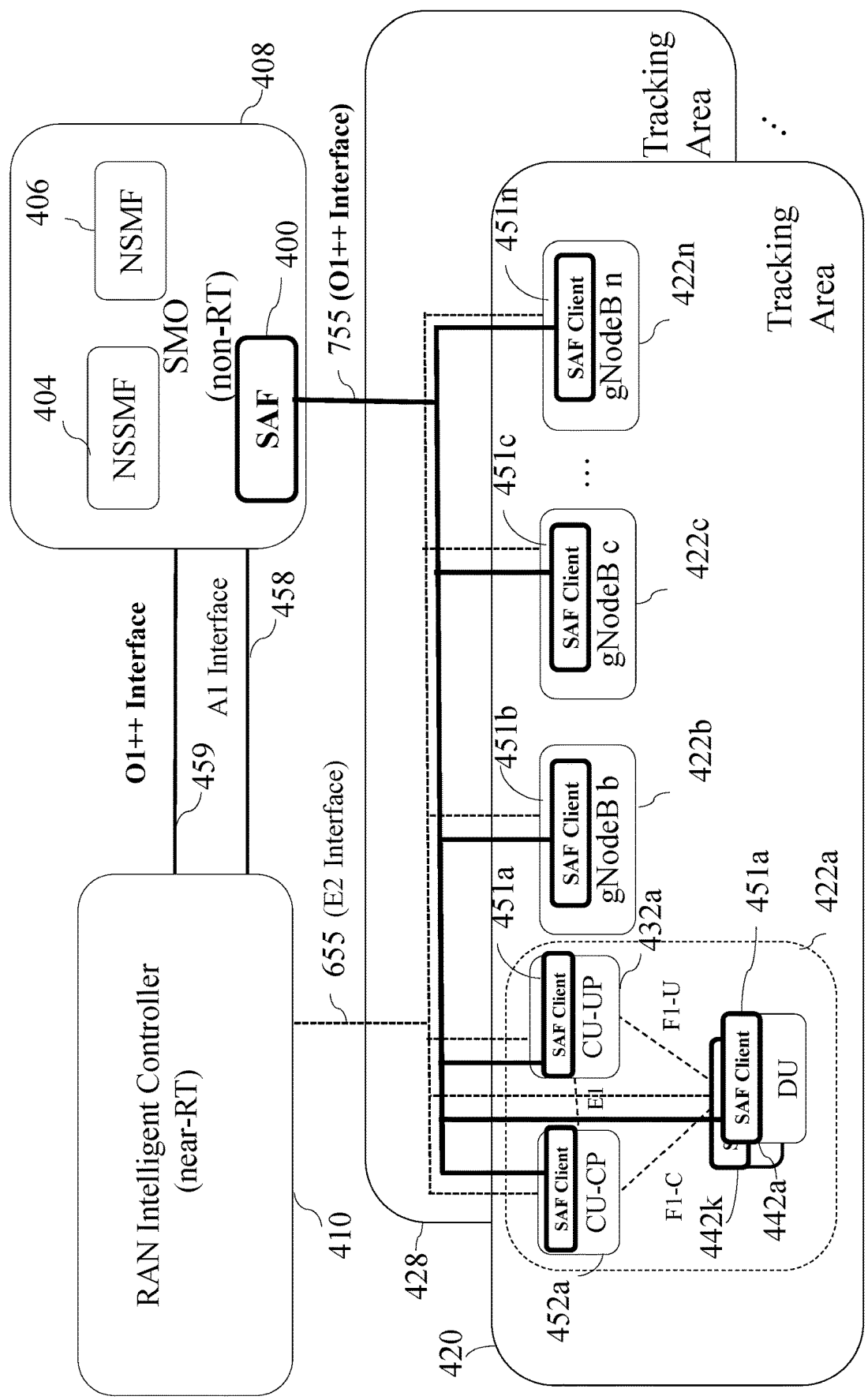
FIG. 4B is a block diagram illustrating an example system with the SAF, the SAF client and the $O1^{++}$ interfaces for non-RT controls, in accordance with techniques of this disclosure.

Another example of SAF 400 is illustrated in FIG. 4B, in which SAF is a component of the SMO (instead of RIC). In this scenario, the interface used for reconfiguration towards the gNodeBs is an extended O1 interface, denoted as O1$^{++}$. Because O1 is designed for non-RT operations, the consequence of this example may be less frequent reconfigurations of the gNodeBs. Although not illustrated in a separate figure, one can easily superimpose FIGS. 4A and 4B to come up with yet another alternate configuration wherein some components of SAF are in RIC (as in FIG. 4A), and other components are in SMO (as in FIG. 4B), which may require extension in the A1 interface between RIC and SMO to support intra-SAF messaging. This interface, which is called A1$^{++}$, has different capabilities depending on the functional split of SAF across these two systems. Such variations in implementation are covered by this disclosure.

In some cases, SAF 400 may apply an artificial intelligence or other machine learning model trained using historical KPIs to predict likely failures of a slice to meet the corresponding SLA. In response to identifying an upcoming likely failure based on recent KPIs, SAF 400 may re-distribute slice resources ahead of the predicted failure time and reconfigure the eNodeBs to avoid the failure.

Figure 5:
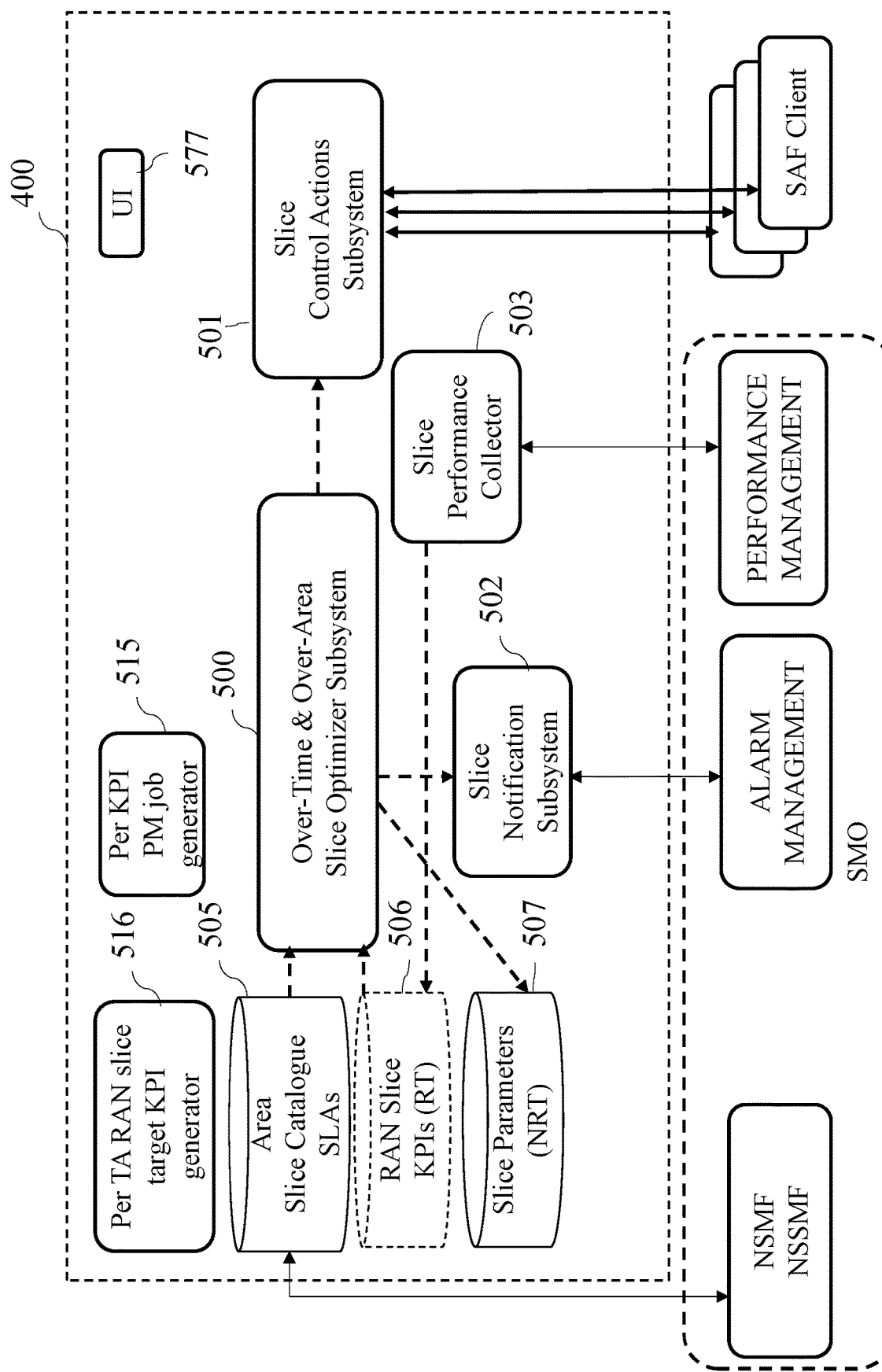
FIG. 5 is a block diagram of SAF, in accordance with techniques of this disclosure.

FIG. 5 is a high-level block diagram of SAF 400, according to some examples of an SAF. Slice Catalogue and Slice SLAs Database 505 is populated by information gathered from NSSMF. Slice Performance Collector 503 collecting measurements from base stations populates Real-Time (RT) RAN Slice KPIs Database 506. Slice Parameters NRT Database 507 stores all the determined slice parameters as assigned to each base station in the TA and over time. Over-Time and Over-Area Slice Optimizer Subsystem 500 calculates weights to apportion the TA's slice SLA configuration to each base station configuration. Slice Control Actions Subsystem 501 maps the weights into proper base station control actions and sends these actions onto base stations 422*a* . . . *n*. The interface between SAF and SAF client supports simple example messages such as:

<ReconfigRequest {ID} {component ID} {time stamp}{param: value1} . . . {param: value1} . . . {param: value1}>: A request from SAF to reconfigure resources using new parametric values.

<FallBackToDefault {component ID} {time stamp}>: A request to fall back to its original/default slice configuration.

<ReconfigResponseSuccess {param: value1} {param: value1} . . . {param: value1} {component ID} {time stamp}>: A response from gNodeB to SAF on successful implementation of reconfiguration <ReconfigResponseFailure {param: value1} {param: value1} . . . {param: value1} {component ID} {time stamp}>: A response from gNodeB on failure of implementing the requested reconfiguration If a slice SLA cannot be met, Slice Notification Subsystem 502 prepares an alarm or warning to send to SMO 408's Alarm Management sub-function. Subsystem 516 determines per-TA RAN-specific slice KPIs and their target and threshold values once the slice catalogue and slice SLAs are obtained. Subsystem 515 generates Performance Management jobs (tasks) to be executed by each gNodeB so that the slice KPIs are collected and reported for the consumption of SAF 400.

Figure 6:
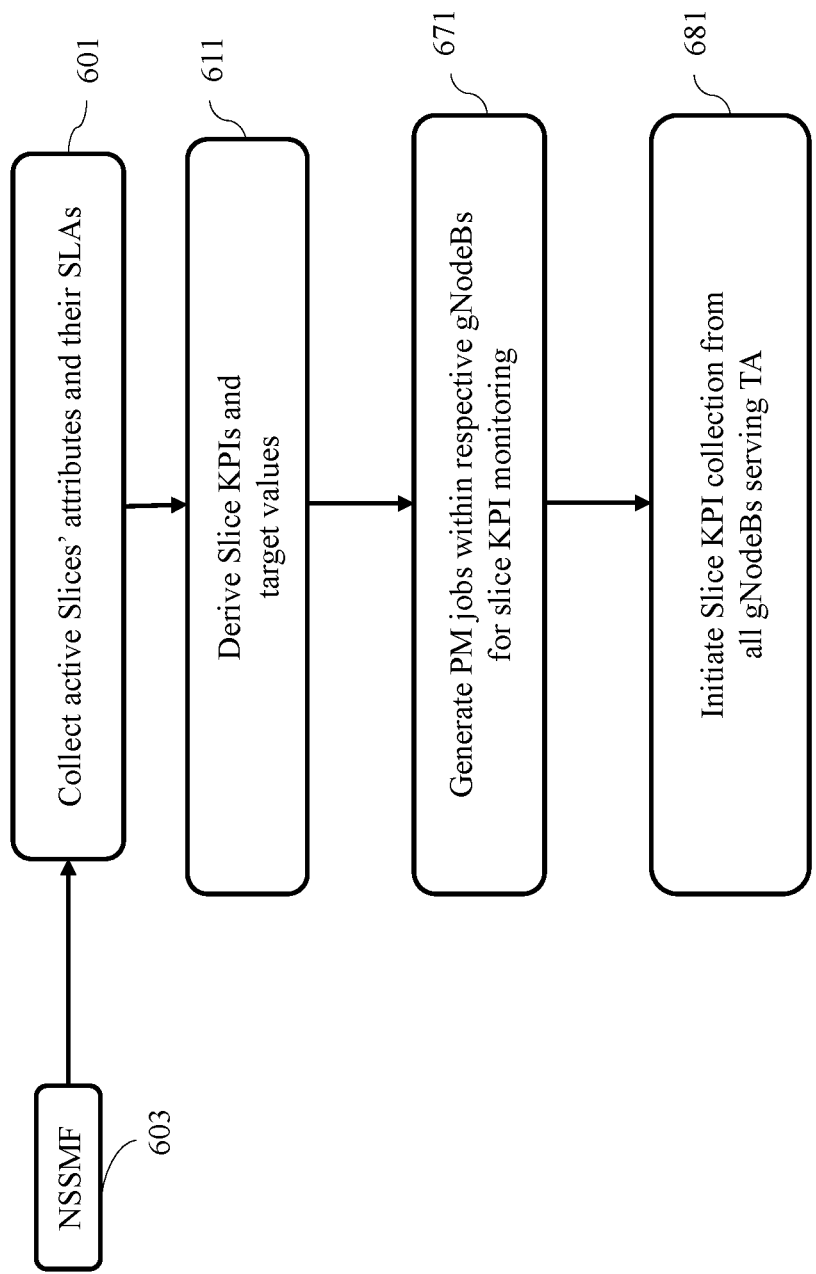
FIG. 6 is a flowchart illustrating an example method of configuring initiating KPI measurements, in accordance with techniques of this disclosure.
Figure 7:
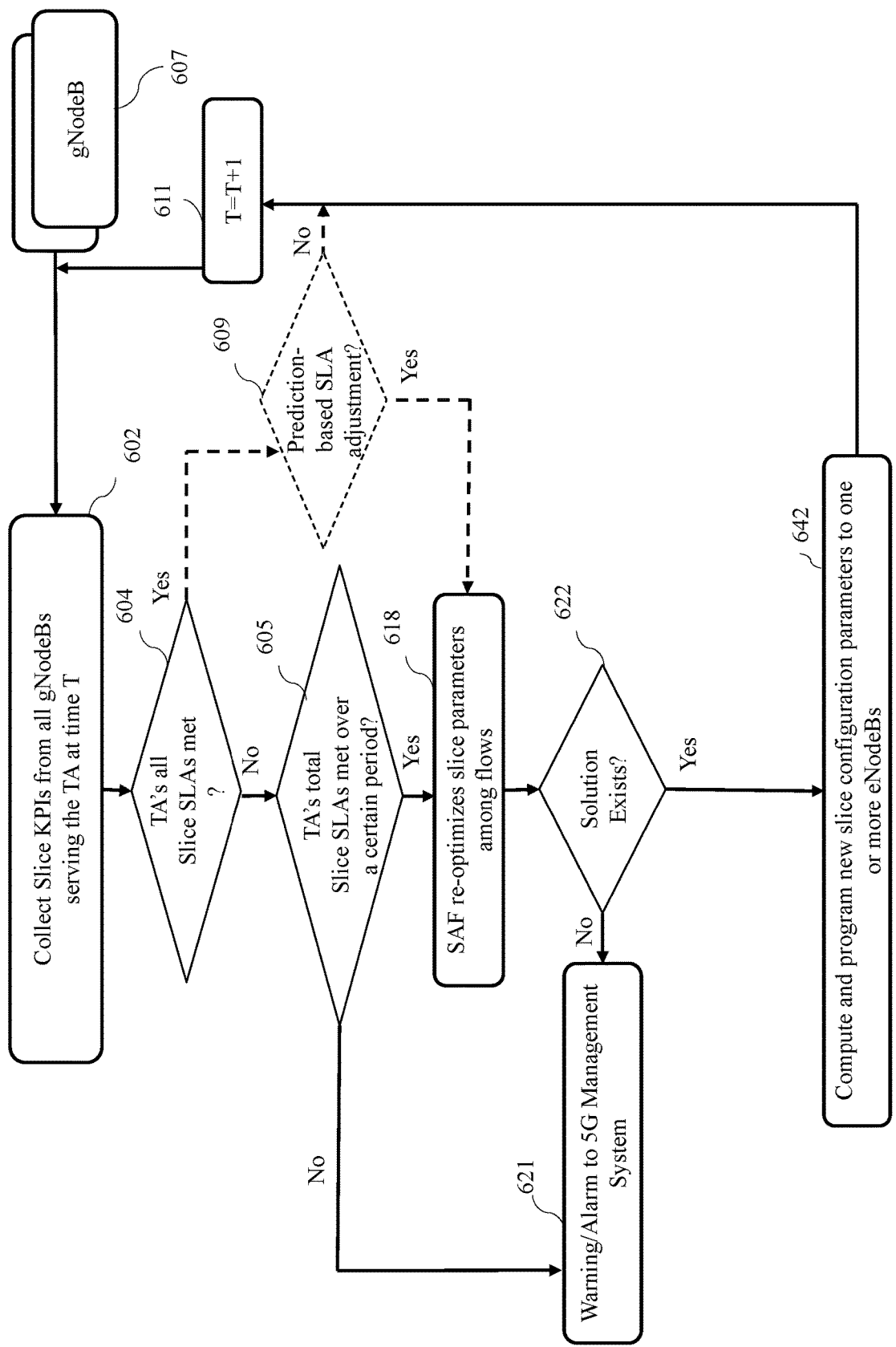
FIG. 7 is a flowchart illustrating an example method of reconfiguring RAN resources using SAF, in accordance with techniques of this disclosure.

Example methods or steps for implementing techniques of the disclosure are shown in FIGS. 6 and 7. At step 601, in FIG. 6, SAF 400 collects all slice types and associated SLAs supported by the TA from NSSMF 603. SAF 400 derives the slice KPIs, their target and threshold values in step 611. Thereafter, SAF 400 generates the PM jobs that each gNodeB must execute for slice-specific KPI monitoring in step 671. Finally, in step 681, RIC 410 communicates the required KPIs to each gNodeB in the Tracking Area and starts collecting from each gNodeB the KPIs for SAF 400's consumption.

At time T, in FIG. 7, SAF 400 collects the KPIs associated with each slice from all base stations in step 602. In checkbox 604, SAF 400 first checks to determine if the slice SLA of the TA is met for each flow within a slice. This check and the following steps are performed for all slices, which may be done iteratively or in parallel. If the answer to checkbox 604 is yes, then SAF 400 waits until the next time interval (T+1) in step 611 to repeat the process.

In some examples, SAF 400 optionally (as indicated by the dashed lines of 609) determines if prediction-based SLA adjustment should be performed (step 609). If not, SAF 400 waits until the next time interval (T+1) in step 611 to repeat the process for the slice. If prediction-based SLA adjustment is to be performed (YES branch of step 609), then SAF 400 performs step 618, which in these examples include re-optimizing slice parameters by applying predictive techniques for predicting likely failures of a slice to meet the corresponding SLA, e.g., those described above. For instance, SAF 400 may predict that one of the SLA for a corresponding slice will not be met and, in response, pre-emptively reallocate slices resources to compute new slice configuration parameters for the slice. SAF 400 may then reconfigure the base stations to implement the new slice configuration parameters for the slice.

However, if some slice SLAs are not met (NO branch of 604), SAF 400 checks to determine if the TA's total slice SLA is met over the time period of T in checkbox 605. If not, an alarm is generated in step 621 towards the SMO. Otherwise, in step 618, SAF 400 redistributes slice resources across one or more base stations. This step may be executed by Over-Time and Over-Area Slice Optimizer Subsystem 500, which computes new slice resource parameters that, when configured into the gNodeBs using slice configuration parameters computed by SAF 400, will realize the slice resources parameters according to the redistribution. In step 622, SAF 400 checks to determine if a feasible solution to redistribution exists such that all slices can meet their associated SLAs. If not, SAF 400 sends an alarm to the Alarm Management in the SMO in step 621. Otherwise, SAF 400 sends the new slice configuration parameters to the at least one of the base stations, in step 642, to realize the new slice resources computed for the slices. Any of the CU-CP, CU-UP, or DU(s) for the one or more base stations may receive the new slice configuration parameters for reconfiguration of the one or more base stations.

ABBREVIATIONS

5G: 5$^{th}$ Generation Mobile Wireless Communication System
AMF: Access and Mobility Function
CP: Control Plane
CU: Central Unit
DU: Distributed Unit
gNodeB: Base Station
IoT: Internet of Things
IP: Internet Protocol
KPI: Key Performance Indicator
NRF: Network Repository Function
NSSAI: Network Slice Selection Assistance Information
NSMF: Network Slice Management Function
NSSMF: Network Slice Subnet Management Function
PM: Performance Management
RA: Registration Area
RU: Radio Unit
QoS: Quality of Service
RAN: Radio Access Network
RIC: RAN Intelligent Controller
SDN: Software Defined Network
SLA: Service Level Agreement
SMO: Service Management and Orchestration
SST: Slice Service Type
TA: Tracking Area
UE: User Equipment
UP: User Plane
VNF: Virtualized Network Function Computer-executable instructions include, for example, instructions and data which cause a general-purpose computer, special-purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry or processing circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), Flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

What is claimed is:

1. A method comprising:
    obtaining, by a slice assurance function (SAF) executed by a device, key performance indicator (KPI) values for a first slice and a second slice of a plurality of slices implemented by a plurality of base stations serving a tracking area of a mobile network;
    determining, by the SAF, based in part on the KPI values for the first slice, a service level agreement (SLA) for the first slice has not been met;
    predicting, by the SAF, based in part on the KPI values for the second slice, an SLA for the second slice will not be met;
    re-allocating, by the SAF in response to the determining, slice resources associated with any of the plurality of slices to compute a new slice configuration parameter for the first slice;
    re-allocating, by the SAF in response to the predicting, the slice resources associated with any of the plurality of slices to compute a new slice configuration parameter for the second slice; and
    reconfiguring, by the SAF, at least one of the plurality of base stations to implement the new slice configuration parameter for the first slice and the new slice configuration parameter for the second slice.

2. The method of claim 1, wherein predicting the SLA for the second slice has not been met comprises predicting the SLA for the second slice has not been met for at least one flow associated with the second slice.

3. The method of claim 1, further comprising:
    outputting, by the SAF, in response to determining a total slice SLA will not be met over a time period, an alarm indicating the tracking area has insufficient resources to meet the SLA for the first slice or the SLA for the second slice.

4. The method of claim 1, wherein re-allocating slice resources associated with any of the plurality of slices comprises:
    re-allocating slice resources, unused by a third slice of the plurality of slices, from the third slice to the second slice to compute the new slice configuration parameter for the second slice.

5. The method of claim 1, wherein re-allocating slice resources associated with any of the plurality of slices to compute a new slice configuration parameter for the second slice comprises:
    re-allocating slice resources, in use by a third slice of the plurality of slices that has a lower priority than the second slice, from the third slice to the second slice to compute the new slice configuration parameter for the second slice.

6. The method of claim 1, wherein re-allocating slice resources associated with any of the plurality of slices to compute a new slice configuration parameter for the second slice comprises:
    forcing handover of a user equipment (UE) that uses the second slice from a first base station of the plurality of base stations to a second base station of the plurality of base stations that supports the second slice.

7. The method of claim 6, wherein the new slice configuration parameter for the second slice comprises an identifier for the second base station that is to serve the UE.

8. The method of claim 1, wherein the device comprises a Radio Access Network (RAN) Intelligent Controller (RIC).

9. The method of claim 8, wherein an E2 interface between the RIC and the at least one of the plurality of base stations is extended to support communications between the SAF and an SAF client for the at least one of the plurality of base stations.

10. The method of claim 1, wherein the device comprises a Service Management and Orchestration (SMO) system.

11. The method of claim 10, wherein an O1 interface or a 3GPP-based management interface between the SMO system and the at least one of the plurality of base stations is extended to support communications between the SAF and an SAF client for the at least one of the plurality of base stations.

12. The method of claim 1, wherein the SAF includes SAF components executed by a Radio Access Network (RAN) Intelligent Controller (MC) and a Service Management and Orchestration (SMO) system.

13. The method of claim 12, wherein an A1 interface is extended to support communications between the SAF component executed by the MC and the SAF component executed by the SMO system.

14. The method of claim 1, further comprising:
collecting, by the SAF, SLAs for all of the plurality of slices;
determining, by the SAF based on the SLAs, slice KPIs to be monitored within the tracking area for each of the plurality of slices; and
generating and outputting, by the SAF to the plurality of base stations, performance management jobs to cause the plurality of base stations to monitor and report the slice KPIs.

15. The method of claim 1, further comprising, for each additional slice of the plurality of slices, iteratively:
obtaining, by the SAF, KPI values for the additional slice;
determining, by the SAF, based in part on the KPI values for the additional slice, an SLA for the additional slice has not been met;
re-allocating, by the SAF in response to determining the SLA for the additional slice has not been met, slice resources associated with any of the plurality of slices to compute a new slice configuration parameter for the additional slice; and
reconfiguring, by the SAF, at least one of the plurality of base stations to implement the new slice configuration parameter for the additional slice.

16. A method comprising:
obtaining, by a slice assurance function (SAF) executed by a device, key performance indicator (KPI) values for a first slice of a plurality of slices implemented by a plurality of base stations serving a tracking area of a mobile network;
determining, by the SAF, based in part on the KPI values for the first slice, a service level agreement (SLA) for the first slice has not been met;
re-allocating, by the SAF in response to the determining, slice resources associated with any of the plurality of slices to compute a new slice configuration parameter for the first slice; and
reconfiguring, by the SAF, at least one of the plurality of base stations to implement the new slice configuration parameter for the first slice,
wherein the at least one of the plurality of base stations comprises a SAF client, and
wherein reconfiguring the at least one of the plurality of base stations to implement the new slice configuration parameter for the first slice comprises outputting, by the SAF to the SAF client, configuration commands to cause the SAF client to reconfigure the at least one of the plurality of base stations.

17. The method of claim 16, wherein the SAF and the SAF client communicate via an interface comprising one of an O1 interface, an E2 interface, or a 3GPP-based performance management interface, wherein the interface is extended to enable collection and reporting of KPI values from the SAF client to the SAF.

18. A slice assurance function (SAF) for a mobile network, the SAF comprising:
a slice performance collector comprising processing circuitry and configured to obtain key performance indicator (KPI) values for a first slice and a second slice of a plurality of slices implemented by a plurality of base stations serving a tracking area of the mobile network;
a slice optimizer subsystem comprising processing circuitry and configured to determine, based in part on the KPI values for the first slice, a service level agreement (SLA) for the first slice has not been met,
wherein the slice optimizer subsystem is further configured to predict, based in part on the KPI values for the second slice, an SLA for the second slice will not be met,
wherein the slice optimizer subsystem is further configured to re-allocate, in response to the determining, slice resources associated with any of the plurality of slices to compute a new slice configuration parameter for the first slice,
wherein the slice optimizer subsystem is further configured to re-allocate, in response to the predicting, the slice resources associated with any of the plurality of slices to compute a new slice configuration parameter for the second slice; and
a slice control actions subsystem comprising processing circuitry and configured to reconfigure at least one of the plurality of base stations to implement the new slice configuration parameter for the first slice.

19. A mobile network comprising:
a plurality of base stations comprising respective, corresponding Slice Assurance Function clients, the plurality of base stations serving a tracking area of a mobile network; and
a Slice Assurance Function comprising processing circuitry and configured to:
obtain key performance indicator (KPI) values for a first slice of a plurality of slices implemented by the plurality of base stations;
determine, based in part on the KPI values for the first slice, a service level agreement (SLA) for the first slice has not been met;
re-allocate, in response to the determining, slice resources associated with any of the plurality of slices to compute a new slice configuration parameter for the first slice; and
communicate, via an interface, the new slice configuration parameter for the first slice to one of the Slice Assurance Function clients to cause the one of the Slice Assurance Function clients to reconfigure the corresponding base station to implement the new slice configuration parameter for the first slice.

* * * * *

UNITED STATES PATENT AND TRADEMARK OFFICE
CERTIFICATE OF CORRECTION

PATENT NO. : 11,336,538 B2
APPLICATION NO. : 17/105833
DATED : May 17, 2022
INVENTOR(S) : Arda Akman, Burcu Sahin and Tugba Arici It is certified that error appears in the above-identified patent and that said Letters Patent is hereby corrected as shown below:

In the Claims

Column 17, Line 14 (Claim 12): replace "Intelligent Controller (MC)" with --Intelligent Controller (RIC)--

Column 17, Line 18 (Claim 13): replace "by the MC" with --by the RIC--

Signed and Sealed this
Twenty-sixth Day of September, 2023

Katherine Kelly Vidal
*Director of the United States Patent and Trademark Office*